United States Patent [19]

Yasui

[11] Patent Number: 4,693,192

[45] Date of Patent: Sep. 15, 1987

[54] CONTROL DEVICE FOR SEWING MACHINE

[75] Inventor: Hideo Yasui, Tokyo, Japan

[73] Assignee: Tokyo Juki Industrial Co., Ltd., Tokyo, Japan

[21] Appl. No.: 799,376

[22] PCT Filed: Feb. 5, 1985

[86] PCT No.: PCT/JP85/00047

§ 371 Date: Oct. 25, 1985

§ 102(e) Date: Oct. 25, 1985

[87] PCT Pub. No.: WO85/03957

PCT Pub. Date: Sep. 12, 1985

[30] Foreign Application Priority Data

Feb. 29, 1984 [JP] Japan ............................ 53-39317

[51] Int. Cl.4 ............................................. D05B 19/00
[52] U.S. Cl. ............................. 112/121.11; 112/454; 112/457; 112/317
[58] Field of Search ............... 112/121.11, 121.12, 112/275, 314, 315, 316, 317, 300, 454, 457, 458

[56] References Cited

U.S. PATENT DOCUMENTS

| | | | |
|---|---|---|---|
| 3,750,603 | 8/1973 | Martin | 112/300 |
| 4,133,275 | 1/1979 | Herzer et al. | 112/121.12 |
| 4,195,582 | 4/1980 | Novick et al. | 112/121.11 |
| 4,469,038 | 9/1984 | Fujikawa | 112/121.11 X |
| 4,499,836 | 2/1985 | Meier et al. | 112/121.11 X |
| 4,526,114 | 7/1985 | Martell et al. | 112/121.11 X |
| 4,555,997 | 12/1985 | Tancs | 112/121.11 |

FOREIGN PATENT DOCUMENTS

| | | | |
|---|---|---|---|
| 0136384 | 8/1983 | Japan | 112/121.11 |
| 0149786 | 9/1983 | Japan | 112/220 |
| 0183192 | 10/1983 | Japan | 112/275 |

*Primary Examiner*—Peter Nerbun
*Attorney, Agent, or Firm*—Wenderoth, Lind & Ponack

[57] ABSTRACT

A control device for sewing machines includes an input device adapted to permit the input of different categories of information including program relative commands, unit sewing pattern relative commands, and numeric data and a discriminator capable of discrimination between a command for programming and one for program execution. The former commands are stored in a memory as program data and the latter commands are read out by means of a program read-out. In a comparitor, the read-out program data are compared with the actual data detected by a detector such as the number of stitches and the lock position of a needle arm. On the basis of this data, a fabric feed mechanism and a thread cut mechanism are ON/OFF controlled. Thus, a variety of sewing patterns can be programmed as required for subsequent readily effected and efficient execution so that operation can be optimal.

5 Claims, 9 Drawing Figures

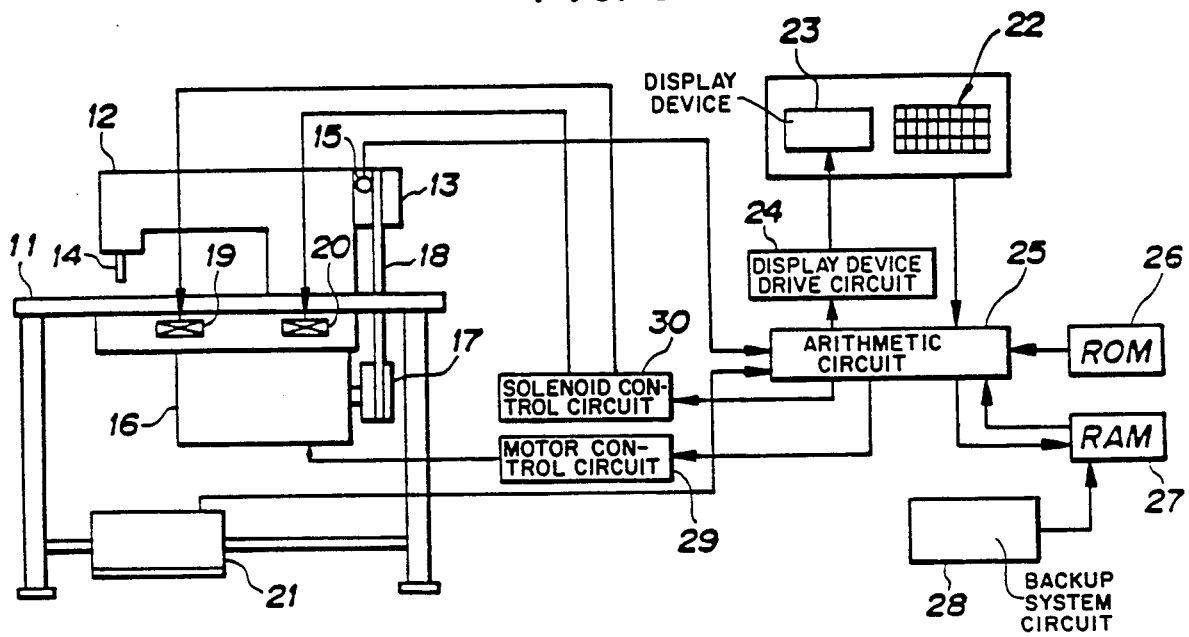

CONTROL DEVICE FOR SEWING MACHINE

FIELD OF THE INVENTION

The invention relates to a control device for a sewing machine and more particularly to a control device for a sewing machine capable of programming various sewing patterns as required by an operator.

BACKGROUND OF THE INVENTION

In a conventional control device for an industrial sewing machine, a limited repertory of sewing patterns such as those shown in FIGS. 1(a)-1(e) are stored in a memory. In the drawings, the capital letters A-J represent respective sewing sections (unit sewing patterns) which comprise sewing patterns. For example, the pattern 1 begins with start bar tacking (SBT) which is itself composed of a forward feed section A and a reverse feed section B, and terminates in end bar tacking (EBT) which it itself composed of a reverse feed section C and a forward feed section D, with the interposition of a free sewing section therebetween. In drawings, symbols "Δ" represent the points where treadling back is conducted by the operator and "x" the point of automatic thread cutting and the following up-lock of the needle arm. The symbols "O" represent the point of automatic down-lock of the needle arm at the end of the preset number of stitches. In actual practice, the operator first selects one of the stored sewing patterns 1-5 by pressing a proper pattern selection key switch 7 located in a control panel 6, as shown in FIG. 2. Then, the desired number of stitches corresponding to the respective sewing sections of the selected sewing pattern is set by means of a digital switch 8 which is only for selecting the number of stitches located in the control panel. The key switches A-D can set from 0 to 9 stitches, while the rest of the switches E-J can set from 0-99 stitches.

In such a prior art control device for sewing machines, however, since only one sewing pattern and the number of stitches can be pre-programmed at one time, when the job requires a combination of different sewing patterns, say, the alternate combination of the patterns 3 and 4, it it necessary to employ alternate use of different sewing machines having different programs or, alternatively, the resetting of the sewing pattern and the number of stitches by means of the pattern selection key switch 7 and the switch 8 for selecting the number of stitches each time the pattern is changed. In either case, this program changing operation is cumbersome for the operator and is apt to lead to input error, which results in a considerable reduction in operating efficiency. Further, since the number of sewing patterns capable of being programmed is limited, these prior art control devices for sewing machines have not been able to properly meet the demands for a diverse sewing design.

SUMMARY OF THE INVENTION

The present invention has been proposed to solve the above-mentioned conventional problem. It is therefore a main object of the invention to provide a control device for a sewing machine of a type in which it is possible for arbitrarily composed sewing patterns to be programmed and for desired sewing patterns to be selected as required by the operator.

To achieve the above object the invention relates to a control device for a sewing machine and comprises input means capable of individually inputting program data including a first category of program relative information consisting of respective commands for at least formation, execution, combination and termination of a program, a second category of unit sewing pattern relative information consisting of respective commands for lock of needle arm, fabric feed, and thread cut, and a third category of numerical information consisting respectively of a program management number and a number of stitches in relation to a sewing pattern forming program for forming a sewing pattern integrally composed of unit sewing patterns; discriminator means for discriminating between commands for program formation and commands for program execution from said input means; memory means for storing input data entered after said command for program formation into the respective allotted program management numbers as program data; read-out means for reading the program data out of a designated program management number of said memory means in response to said command for program execution; detector means for detecting the number of stitches and the lock position of said needle arm from the rotational phase of a top shaft driven by a sewing machine drive motor each time said top shaft rotates; comparison means for comparing output of said detector means with data concerning the number of stitches in said read-out program data; output control means for ON/OFF controlling a reverse solenoid of a fabric feed mechanism and a thread cut solenoid of an arm of the sewing machine in accordance with the results obtained from said comparison; and control means for lock of the needle arm at a predetermined position in accordance with said demand for lock of the needle arm in the program data.

As described above, since the input means in the present invention is capable of inputting unit sewing patterns comprising various sewing patterns which permits an operator to make various kinds of programs by combining said unit sewing patterns freely, and the control means for the drive of the sewing machine can be controlled in accordance with a program determined by the operator as desired, its working efficiency is far improved in comparison with the prior art. In addition to that, the present device can readily meet the demand for diverse sewing patterns.

BRIEF EXPLANATION OF THE DRAWINGS

FIG. 3 is a system circuit arrangement of a preferred embodiment of a sewing machine control device constructed in accordance with the present invention;

FIG. 4 is an enlarged plan view of the input means for the embodiment of FIG. 3.

DESCRIPTION OF THE PREFERRED EMBODIMENT

Figures 1A, 1B, 1C, 1D, 1E:
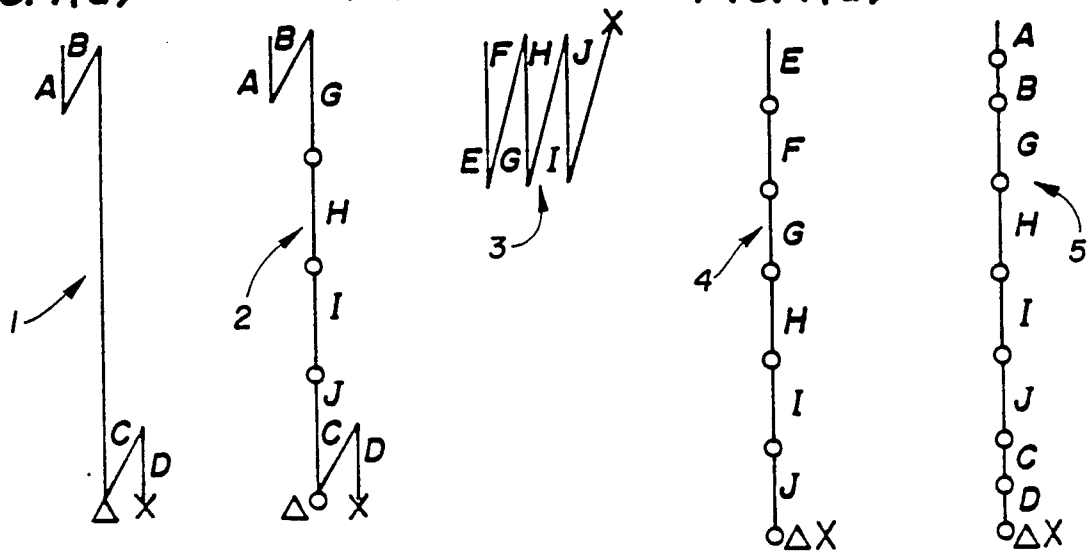
FIG. 1(a) to (e) depict schematic representations of sewing patterns 1-5.
Figure 2:
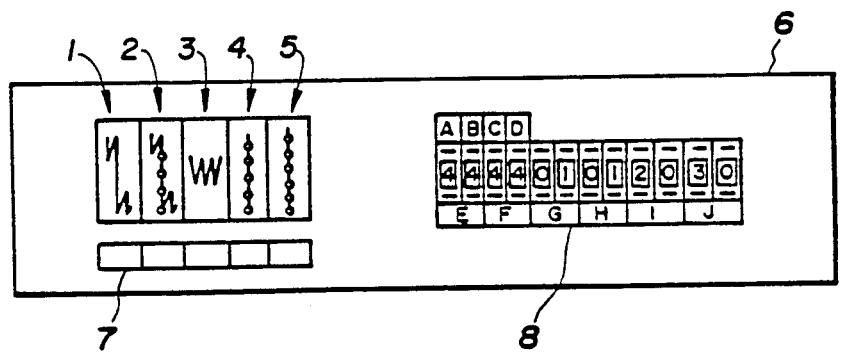
FIG. 2 is a plan view of a control panel for a typical conventional sewing machine control device.
Figure 5:
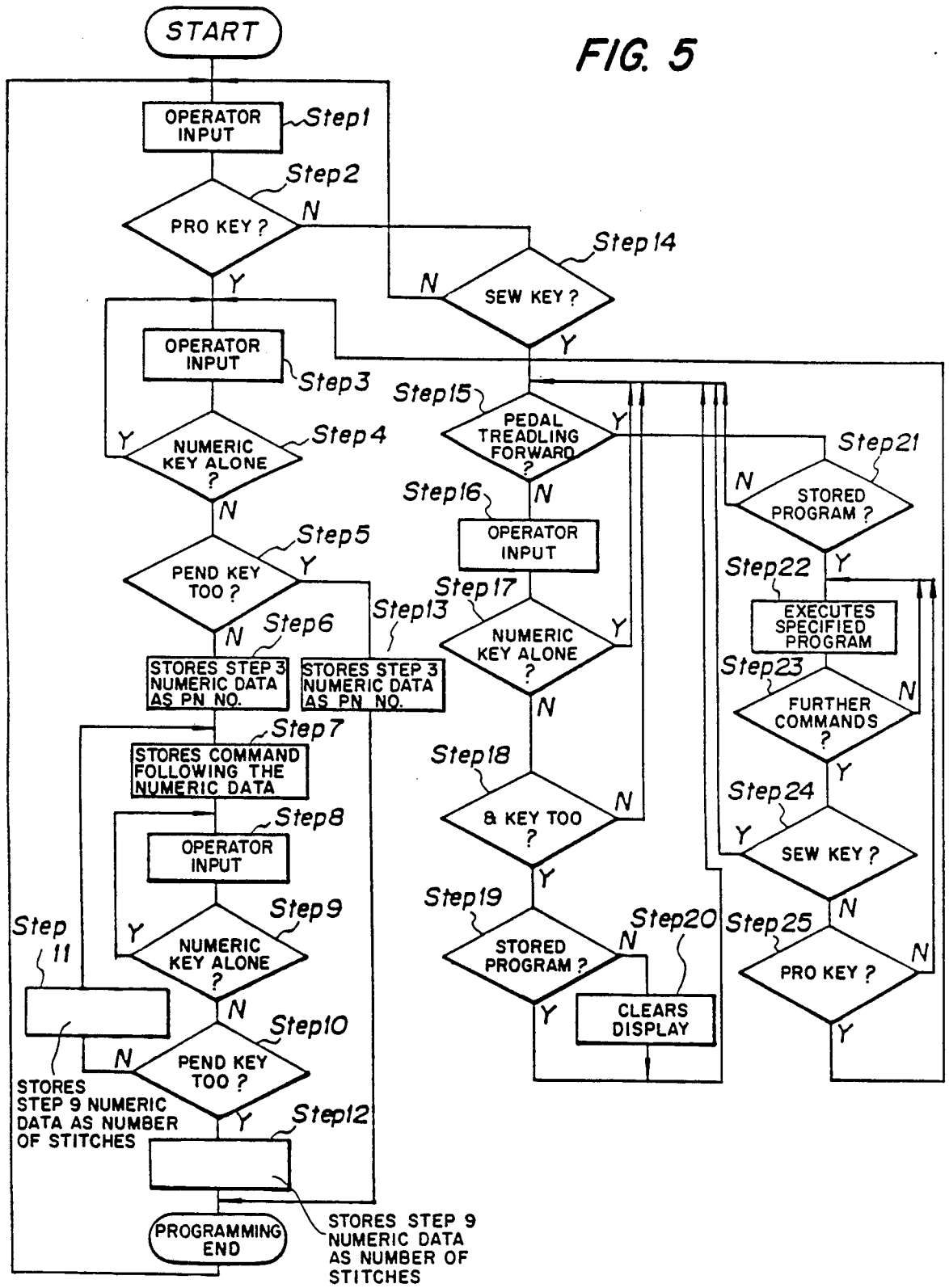
FIG. 5 is a flowchart of a sewing machine control device according to this invention.

FIGS. 3-5 illustrate one preferred embodiment in accordance with the present invention.

Referring first to FIG. 3, which shows the system arrangement of the preferred embodiment, numeral 11 represents a sewing table, numeral 12 the arm of a sewing machine, and numeral 13 a pulley connected to a top shaft (not shown) enclosed in the arm. Provided within the pulley 13 is a detector means 15 which detects the number of stitches and the locked position of a needle arm 14 from the rotational phase of the top shaft each time the top shaft rotates. The numeral 16 represents a drive motor mounted on the sewing table 11, numeral 17 a pulley fixed to the output shaft of the motor 16, numeral 18 a drive belt which is wound about both the pulleys 13 and 17, numeral 19 a thread cut solenoid for actuating a conventional thread cut mechanism (not shown), numeral 20 a fabric feed reverse solenoid which actuates a conventional built-in fabric feed mechanism (not shown) to move the fabric in reverse direction, and numeral 21 an operator actuated treadle pedal of known type for controlling the sewing machine. Signals for "treadling forward" and "treadling back" are respectively produced from a built-in switch in accordance with the action of the operator's pedal operation.

The numeral 22 represents a keyboard for inputting various kinds of sewing pattern forming program data, as will be described in detail later, numeral 23 a display screen for displaying the contents of entered information, numeral 24 a drive circuit for the display screen, numeral 25 an arithmetic circuit (central processing unit), numeral 26 a ROM which is pre-programmed with basic control data such as to govern the arithmetic circuit 25 under a given rule, numeral 27 a RAM which stores input data from the keyboard 22 for subsequent retrieval, and numeral 28 a backup circuit which retains the contents stored in the RAM 27 in case of a power loss. The numeral 29 represents a motor control circuit for ON/OFF controlling the drive motor 16 in response to a command from the arithmetic circuit 25. Similarly, the numeral 30 represents an output control circuit for ON/OFF controlling the thread cut solenoid 19 and the fabric feed reverse solenoid 20 in response to a command from the arithmetic circuit 25 whereby the fabric feed direction and the thread cut operation of the arm 12 are controlled.

Referring to FIG. 4, which is an enlarged view of the keyboard 22, the numerals 31-36 represent key switches for inputting relative information on program performance such as commands for formation, execution, combination and termination of a sewing pattern forming program. In more detail, the numeral 31 represents a program execution command key (Sew key) which calls the pattern forming program stored in previously established RAM 27 to command the sewing machine to be operated in accordance with the contents thereof. The numeral 32 represents a program combination command key (& key) which calls a plurality of stored programs in order to command the execution of these programs in sequence. The numeral 33 represents a key (Pout key) which is used when the operator wants to operate the sewing machine arbitrarily without using the stored program. The numeral 34 represents a program establishment key (Pro key) which notifies the arithmetic circuit 25 of the beginning of program establishment. The numeral 35 represents a step calling key (STEP key) which commands required step calling when the operator requires a part of the previously established program to be modified. The numeral 36 represents an end command key (PEND key).

The numerals 37-44 are another group of key switches for inputting unit sewing patterns of the sewing patterns together with information on fabric feed, lock of the needle arm and thread cut. In more detail, the numeral 37 represents a start bar tacking key (SBT key) which commands start bar tacking composed of a forward feed stitching and a reverse feed stitching. The numeral 38 represents an end bar tacking key (EBT key) which commands an end bar tacking composed of a reverse feed stitching and a forward feed stitching, a reversed version of the design performed by the SBT. The numeral 39 represents a reverse stitching partition key for distinguishing the number of forward stitches and the number of reverse stitches during reverse stitching. The numeral 40 represents a free stitching command key. When the operator comes to the point set by this key 40, he is required to treadle forward on the pedal 21 to stop controlling the number of stitches and thereby allow the operator to sew freely after that. The numeral 41 represents a continuous sewing command key which commands that the next step be sequentially continued after the previous step without stopping the operation of the sewing machine. The numeral 42 represents a thread cut command key which commands that the thread cut mechanism be automatically actuated after the previous step is terminated by energizing the thread cut solenoid 19. The numeral 43 represents a down-lock command key which commands that the needle arm 14 by locked at a down-lock position after the previous step is ended. The numeral 44 represents an up-lock command key which commands that the needle arm 14 be locked at its up-lock position after the previous step is ended. The numeral 45 represents numeric keys (ten keys) capable of inputting 0-9. Through these keys numerical information such as the program management number, and the number of stitches of unit sewing patterns comprising the sewing pattern can be input.

Table 1 lists examples of programs for forming sewing patterns created through the key means 22.

In the table, the program management numbers are given in the "Pn No." column, numeral 47 represents a pattern configuration and the number of stitches to be executed or programmed, numeral 48 represents a sequential procedure of key switches which allow the above-mentioned pattern configuration and the number of stitches to be set.

TABLE 1

| Pn No. | 47 Sewing patterns | 48 Programming and its execution |
|---|---|---|
| 1 | →—X | programming: Pro—1—PEND |
| | | execution: Sew—1, or Pout |

TABLE 1-continued

| Pn No. | Sewing patterns | Programming and its execution |
|---|---|---|
| 2 |  | programming: Pro — 2 — SBT — 5 — / — 4 — — →<br>Free — EBT — 4 — / — 5 — PEND<br>execution: Sew — 2 |
| 3 | 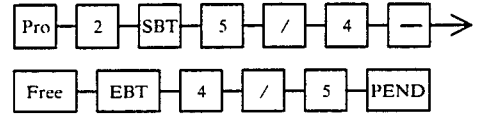 | programming: Pro — 3 — SBT — 8 — / — 9 — / →<br>8 — / — 9 — / — 8 — — — TRM →<br>PEND<br>execution: Sew — 3 |
| 4 | 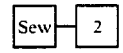<br>15 8 10 | programming: Pro — 4 — SBT — 4 — / — 4 — →<br>down-lock 0 — 1 — 5 — down-lock 0 →<br>8 — down-lock 0 — 1 — 0 — down-lock 0 →<br>Free — EBT — 4 — / — 4 — PEND<br>execution: Sew — 4 |
| 5 | combined execution of the above Pn No. 2-4<br>3→3→2→3→3→4<br>(repeat) | execution: Sew — 3 — & — 3 — & — 2 — & →<br>3 — & — 3 — & — 4 |

The sewing pattern forming program in accordance with the above-mentioned procedure is allotted and stored in the program management number in the RAM 27 for subsequent retrieval through the arithmetic circuit 25. The arithmetic circuit 25 is composed of a discriminator circuit capable of discrimination between a program formation command entered by Pro key 34 and a program execution command entered by Sew key 31, a read-out circuit capable of reading the program stored in the allotted program management number in the RAM 27 in response to the program execution command, and a comparison circuit for comparing the relative data on the number of stitches in the programmed data read out with the rotational phase of the top shaft and the down-lock signal of the needle arm. Under the control program stored in the ROM 26 described hereinafter, the sewing machine is operated while data is exchanged between the ROM 26 and the RAM 27, and judgement and calculation of data are conducted.

The operation of this embodiment will be explained with reference to the flowchart in FIG. 5.

The operator may press either the Sew key 31 or the Pro key 34 on the keyboard 22 (Step 1).

The arithmetic circuit 25 decides or judges if the Pro key was pressed. If so (Yes), it stays on to wait for the next operator input. If not (No), it jumps to Step 14 (Step 2).

If the operator's next input (Step 3) is also from the numeric keys 45, the circuit awaits the next operator input (Step 4).

When the numeric key 45 is not pressed, the circuit then decides if the PEND key 36 was pressed also (Step 5). If yes, it registers as a program management number (Pn No.) the number entered at Step 3 above in the RAM 27 (Step 13) to end the programming.

If no, the circuit registers as a program management number the first numeric data input (Step 6) and awaits the next key input.

When the next key input is entered, the circuit then proceeds to register it as an operation relative command such as one entered through the SBT key 37 (Step 7). When the following operator input (Step 8) is numerical, the circuit returns to the Step 8 (Step 9) and continues in such loop until the key input is not numerical. Then the circuit judges whether PEND key 36 was pressed (Step 10). IF not, the circuit registers the latest numerical input as a number of stitches of relative data (Step 11) and returns to Step 7. When the PEND key was pressed, the circuit registers it as the number of stitches of relative data (Step 12), end the program and returns to Step 1. In a similar manner, as many arbitrarily determined sewing pattern forming programs as the operator desires can be registered. In the Step 14, the input is judged to be one from the Sew key 31 for program execution, and the circuit then judges whether treadling forward of the pedal 21 is being conducted (Step 15). When the key switch input is entered without the pedal 21 being treadled forward (Step 16), the circuit judges whether such input is numerical (Step 17). If yes, the loop for returning to the Step 15 is repeated. When a non-numerical input is entered, the circuit then judges whether such input is one from the & key 32 (Step 18). If no, the circuit returns to the Step 15. When the input is one from the & key 32, the circuit judges whether the registered program having the same number as input is entered on the Step 16. If such program exists, the circuit returns to the Step 15 intact. When such program does not exist, the operator clears the display projected on the display screen 23 (Step 20), and the circuit returns to the Step 15. The loop from Step 15 to Step 20 is shown in Pn No. 5 in Table 1 which combines a plurality of programs. When treadling forward of the pedal (Step 15) is entered just after the input from the Sew key 31 (Step 14), the circuit returns to the Step 21. After that, the circuit judges whether a registered program having the same number as the execution command number exists (Step 21). If yes, such designated program is executed (Step 22).

Then, the circuit judges whether additional input is entered (Step 23). If yes, the circuit further judges whether such input is one from Sew Key 31 (Step 24) or one from Pro key 34 (Step 25). In the former case, the circuit returns to Step 15 and in the latter case returns to Step 3. When neither the former nor the latter case applies, the circuit proceeds to execute the program entered in Step 22. Meanwhile, at anytime when an input is entered through any of the key switches, the contents of the input are displayed on the display screen 23.

In this particular embodiment, the number of stitches produced by the needle arm is detected through needle position relative signals from the detector means 15. However, this detector means may be designed to sense a pulse signal or pulse signals which is or are generated in proportion to the rotation of the sewing machine shaft. The keyboard 22 may be replaced by an audio input unit. A known magnetic clutch brake motor or magnetic coupling motor may be used to control the needle arm 14 instead of the drive motor mechanism of this embodiment in which the motor 16 is energized or deenergized to govern the needle. The RAM 27 may be superceded by a valve memory element as the storage medium. Magnetic cards, magnetic tapes, or magnetic discs may also be used so that sewing patterns programmed on one sewing machine can be used on another.

Although the present invention may be embodied in a most preferable fashion in the above-described manner, attention should be called to the fact that the specific structure given in the specification of the drawings is by way of illustration only and changes can be made thereto within the scope of the present invention.

I claim:

1. A control device for a sewing machine comprising:

input means capable of individually inputting a variety of information as program date including a first category of program relative information consisting of respective commands for at least formation, execution, combination and termination of a program, a second category of unit sewing pattern relative information consisting of respective commands for lock of needle arm, fabric feed, and thread cut, and a third category of numerical information consisting of a program management number and the number of stitches in relation to a sewing pattern forming program for forming a sewing pattern integrally composed of unit sewing patterns;

discriminator means for discriminating between commands for program formation and commands for program execution from said input means;

memory means for storing input data entered after said command for program formation into the memory as respective allotted program management numbers;

read-out means for reading a program management number out of said memory means in response to said command for program execution;

detector means for detecting the number of stitches and the lock position of said needle arm from the rotational phase of a top shaft driven by a sewing machine drive motor each time said top shaft rotates;

comparison means for comparing the output of said detector means with data concerning the number of stitches in said read-out program data;

output control means for ON/OFF controlling a reverse solenoid of a fabric feed mechanism and a thread cut solenoid of an arm of the sewing machine in accordance with the results obtained from said comparison;

control means for lock of the needle arm at a predetermined position in accordance with the command for lock of the needle arm in the program data;

means for sequentially designating stored management numbers;

means for sequentially storing a designated management number; and means for reading-out and executing program data corresponding to the designated management number based on a stitching instruction in accordance with the designated sequence, whereby the stitches are sequentially performed by a combination of different program data.

2. A control device as set forth in claim 1, wherein said input device includes a keyboard capable of separately inputting program data including said variety of information.

3. A control device as set forth in claim 1, wherein said input device includes an audio unit adapted to permit the input of said program data including said variety of information by audio signal.

4. A control device as set forth in claim 1, wherein said memory means is a microcomputer controlled random access memory (RAM).

5. A control device as set forth in claim 1, wherein said memory means is an exchangeable memory means so that a programmed sewing pattern can be used by other sewing machines.

* * * * *